April 23, 1968     M. ROSNER     3,379,903

MAGNETOHYDRODYNAMIC GENERATOR WITH SULPHUR CONTAINING FUEL

Filed Nov. 9, 1964

INVENTOR

Manfred Rosner

BY Pierce, Scheffler & Parker
ATTORNEYS

United States Patent Office 3,379,903
Patented Apr. 23, 1968

3,379,903
MAGNETOHYDRODYNAMIC GENERATOR
WITH SULPHUR CONTAINING FUEL
Manfred Rosner, Wettingen, Switzerland, assignor to
Aktiengesellschaft Brown, Boveri & Cie., Baden,
Switzerland, a joint-stock company
Filed Nov. 9, 1964, Ser. No. 409,854
Claims priority, application Switzerland, Nov. 29, 1963,
14,639/63
2 Claims. (Cl. 310—11)

ABSTRACT OF THE DISCLOSURE

A magnetohydrodynamic generator is operated on an open cycle with discharge to atmosphere and utilizing fuels having a relatively high sulphur content and an additive seeding material such as potash to augment ionization of the working gas and thereby increase its electrical conductivity. To prevent undesirable discharge of sulphur oxides in the gases exhausted to atmosphere, the amount of the additive utilized is at least sufficient to bind in as a compound any sulphur oxides which may be present. These compounds are recovered prior to discharge of the gas to atmosphere which is thus rendered relatively pure and sulphur-free, are then chemically transformed to remove sulphur, and the additive re-introduced into the generator.

The present invention realtes to magnetohydrodynamic generators for the production of electrical power. A magnetohydrodynamic generator is a device which includes a channel containing one or more pairs of spaced electrodes arranged transversely to the axis of the channel and means for establishing a magnetic field also transversely through the channel and between the spaced electrodes. A hot ionized working gas is caused to flow at high velocity through the channel in an axial direction between the electrodes and magnetic field and causes an electrical potential to be produced at these electrodes.

Ionization of the working gas can be augmented by admixing suitable additives therewith in order to obtain a higher conductivity, which is most desirable, and it is particularly advantageous, as disclosed in my copending application Ser. No. 153,810, filed Nov. 21, 1961, now U.S. Patent No. 3,247,405 granted Apr. 19, 1966, to utilize as an additive an element in pure form, or as a compound thereof in oxide or carbonate form, for example, selected from the first to the third groups of the Periodic Table, and to recover the valuable additive from the working gas prior to discharge of the latter as waste to atmosphere. If desired, the additive so recovered can be re-introduced into the working gas in the channel on the upstream side of the electrodes and magnetic field.

When the working gas is heated by combustion of ordinary fuels which contain sulphur, the same difficulties arise as in the case of a conventional power plant. This is to say, the exhaust gases include sulphur dioxide which is not only troublesome but is also harmful to animal and plant life, it being difficult to draw a sharp line of distinction as between disturbances and actual damage. Some licensing authorities for power plant construction projects permits no more than 0.5 mg. of sulphur dioxide per Nm.³ of exhaust gas for short periods. Such limitation on sulphur content can, of course, be made even more strict thus making it still more impractical to use fuels having a relatively high sulphur content.

The object of the present invention is to make it practical, where additives of elements or compounds thereof in oxide or carbonate form from the first to the third groups of the Periodic Table are added to the working gas to improve its electrical conductivity, to use a fuel containing sulphur, and this desirable result is brought about by using the additives in at least such a quantity as will bind-in as a compound any sulphur oxides present in the gas. After recovery of the additive with the sulphur oxides bound-in, the working gas can then be permitted to escape to the atmosphere, it having thus been rendered relatively pure and sulphur-free, and therefore harmless.

Moreover, the sulphur product thus recovered from the working gas is industrially usable and therefore not lost. The additive element which is also recovered can be re-introduced into the working gas but only after the sulphur, such as in the form of sulphur dioxide, has been at least partially removed by a chemical separation process. Re-introduction of the additive with sulphur dioxide present in relatively large quantities is not practical. This is due to the fact that even by using a very great excess of additive, the latter would no longer be able to bind in the sulphur dioxide due to the continuously repeated re-use, and hence, sulphur dioxide would discharge into the atmosphere with the exhaust gases unreduced and unhindered.

To be able, nevertheless, to use sulphur-containing fuels without harm to the environment and to cycle the additive continuously, the sulphur contained in the recovered additive is removable therefrom at least partially prior to admixing again with the working gas by known chemical processes, and the latter are interposed in the additive cycle exteriorly of the channel. The necessary capacity of such a separating-out process will, of course, depend upon the quantity of sulphur supplied to the generator per unit of time, since obviously the same quantity must be eliminated again in the same unit of time.

If the quantity of sulphur in the fuel is great in relation to the quantity of additive,, then it is desirable to send the entire amount of the recovered additive, with the sulphur dioxide bound-in, through the separating system, with no particular requirements concerning chemical uniformity of the treated additive, ready to be used again. It is thus not necessary that the sulphur should be completely removed so that simple separation systems can be used. If the quantity of sulphur in the fuel is small in relation to the additive, it then suffices to purify only a part of the recovered additive from sulphur and to admix the additive material thus processed to the remaining portion of the recovered additive prior to its reintroduction into the working gas of the generator. The removal of the part to be purified may be effected continuously or intermittently for predetermined periods of time.

One practical embodiment for the invention is shown in the accompanying drawings.

With reference now to the drawings, the magnetohydrodynamic generator comprises an elongated tubular duct or channel 1 through which is passed a hot working gas 2 produced by combustion in a combustion chamber, not shown, and which is supplemented by an additive 3 that serves the purpose of ionizing the gas and hence, raising its electrical conductivity. The additive can be selected from any element from the first to the third group of the Periodic Table in any amount desired, and can be either in pure form or as part of a compound. In the present embodiment, the additive is assumed to be potash.

Figure 1:
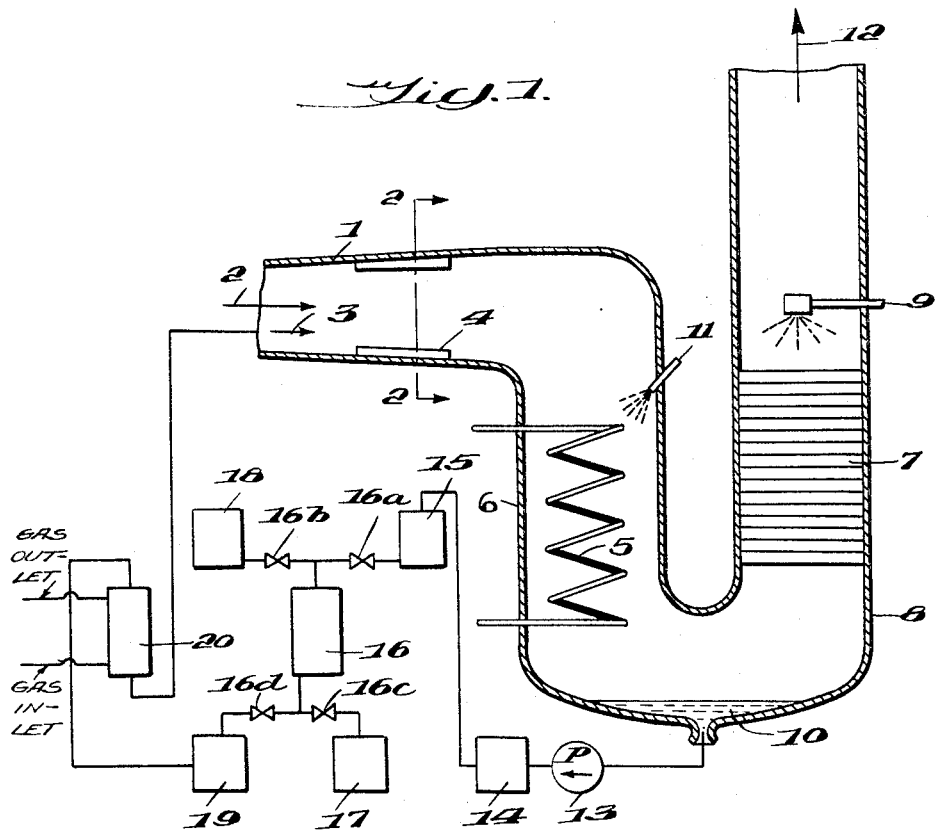
FIG. 1 is a schematic view of the improved generator system.
Figure 2:
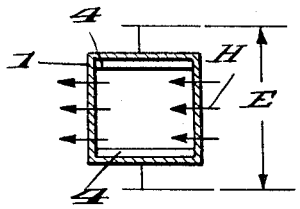
FIG. 2 is a transverse section through the gas channel on line 2—2 of FIG. 1.

Located within channel 1 which may be established by a rectangularly configured duct are the other components essential to a generator of the magnetohydrodynamic type. These include the spaced electrode plates 4 located on one pair of opposite walls of the rectangular duct 1 and a magnetic field indicated by the letter H which passes through the other pair of opposite side walls of the duct and which has a direction transverse to the direction of flow of the hot working gas through the channel as shown in FIG. 2. During operation of the generator there occurs between electrode plates 4 a direct voltage E having a magnitude which depends, among other things, on the gas temperature, its velocity and ionization, and the strength of the magnetic field. After the working gas 2 supplemented by the additive 3 passes through that part of the channel containing the electrodes 4 giving off energy, it is cooled as far as possible by downward flow through a heat exchanger 5 located in one vertical leg 6 of a U-shaped part of the channel. This heat exchanger can constitute a part of a steam turbine plant, for example, its steam generator, or it can be used for preheating the fuel and the combustion air for the magnetohydrodynamic generator itself, or it can be a component of any other useful system.

After the working gas and additive pass the heat exchanger 5, they flow upward through a gas washer 7 located in the other vertical leg 8 of the U-shaped channel portion. This gas washer can be a gas scrubbing plant of known design and the necessary wash water can be supplied through a spray nozzle indicated at 9. The additive with the sulphur oxides from the working gas bound into it as a compound and which is thus separated from the working gas in the gas washer unit 7 accumulates as an aqueous solution 10 of a mixture of potassium salts in the sump located at the lower point of the U-shaped channel portion. The heat exchanger 5 is cleaned periodically by means of a spray nozzle 11 and this solution likewise accumulates in the sump. The working gas cleansed in the gas washer 7 of the additive with the bound-in sulphur oxides is then permitted to escape to atmosphere through the outlet 12.

Insoluble material is separated from the solution 10 by the filter 14, located at the discharge side of the pump 13. In the evaporator 15 potassium sulphate precipitates out upon concentration. The precipitate is separated and absorbed as an aqueous suspension in the apparatus 16 on a solid or liquid cation exchanger, present in the form of ammonium. There thus results a solution of predominantly ammonium sulphate, collected in a tank 17, which constitutes a valuable by-product. The ion exchanger is then regenerated with 10% ammonia coming from a container 18, and the extracted potash lye after being stored in a receptacle 19 is transformed into potash in the reactor 20 by reaction with exhaust gas. The latter product can now be re-admixed in liquid or solid form or as a solution with the working gas. The flow diagram indicates the positon of the necessary valves 16a, b, c, d.

The sulphur is obtained in a commercially usable form, e.g. technically pure, as sulphuric acid, or as fertilizer. The yield of these useful products is thus deductable from the cost of operating the processing system. Moreover, it must be taken into consideration that even a new batch of additive usually requires some pre-treatment before use. For example, potassium chloride must be de-chlorinated completely before it can be used as an additive for the working gas. The installation required for this may be small and inexpensive because of the sulphur separation and re-use of the additive rendered possible thereby, if it is used only to replace the inevitable losses of additive. In the latter case, even sulphur-containing additive, e.g. potassium sulphate, may be supplied to cover the losses, if this should prove economically favorable since, after recovery of the additive, naturally also this sulphur portion is extracted in the processing plant. Then also it must be considered that now even fuels of high sulphur content, which are obtainable at relatively low cost, can be used without hesitation.

In addition to the sanitary necessities, other important advantages in terms of corrosion advocate processing of the recovered additive. It should also be noted that with binding-in of the sulphur dioxide, high smokestacks will no longer be necessary.

When all of these factors are taken into consideration, it is seen that the additional processing unit provided for the generator installation, for separating out the sulphur compound from the additive in the exhaust gas will, to a large extent, pay for itself and in most cases even bring about economic advantages, thereby lowering the cost of the current generated.

It is desirable to separate, together with the sulphur, also other concomitant elements which are disturbing for one reason or another, an example being corrosive vanadium. This is possible due to the fact that also vanadium is combined by elements from the first to the third groups of the Periodic Table thus can be removed. The admixture of these additives to the working gas for the purpose of keeping the air pure would, of course, be applicable also in conventional power plants, but it is particularly in a magnetohydrodynamic generator plant, where additives are indispensable for other reasons, that an economically acceptable solution results.

I claim:

1. The method of operating a magneohydrodynamic generator apparatus for generation of electric power including a gas channel through which flows a high velocity working gas containing sulphur oxides, spaced electrodes located in said channel for taking off the generated current and a magnetic field extending across said channel at said electrodes and transverse to the direction of gas flow therethrough, which comprises the steps of adding an element in pure form or as a compound selected from the first to the third groups of the Periodic Table to said working gas for ionizing the same prior to flowing through said spaced electrodes and magnetic field, the amount of the additive being at least sufficient to bind in as a compound any sulphur oxides present in said working gas, recovering said compound from said working gas prior to discharge of the latter as waste in a sulphur-free state to atmosphere, chemically transforming the recovered compound to remove sulphur content and reconstitute the additive, and re-introducing the latter to said channel in advance of said electrodes and magnetic field.

2. The method of operating a magnetohydrodynamic generator as defined in claim 1 wherein only a part of the recovered compound is chemically transformed to remove the sulphur content and is then re-combined with the remaining part of the compound and re-introduced into said channel in advance of said electrode and magnetic field.

References Cited

UNITED STATES PATENTS 3,214,615  10/1965  Way _____ 310—11

OTHER REFERENCES

Paper by Wright et al., published in book titled: MPD Electric Power Generation, pages 28 to 31, by the I.E.E., Savoy Place, London; paper presented at symposium at Kings College, University of Durham, Sept. 6–8, 1962.

DAVID X. SLINEY, *Primary Examiner.*